Patented Dec. 18, 1951

2,578,847

UNITED STATES PATENT OFFICE 2,578,847

HEXAHYDROPYRIMIDINE-4,6-DIONES

William Robert Boon, Herbert Clare Carrington, and Charles Henry Vasey, Blackley, Manchester, England, assignors to Imperial Chemical Industries Limited, a corporation of Great Britain No Drawing. Original application July 11, 1950, Serial No. 173,248. Divided and this application July 5, 1951, Serial No. 235,372. In Great Britain July 27, 1949

2 Claims. (Cl. 260—260)

This invention relates to a process for the manufacture of new pyrimidine derivatives which we have found to possess anti-convulsant properties and is a division of co-pending application Serial No. 173,248.

The said new pyrimidine derivatives are compounds of the general formula

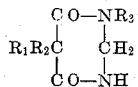

wherein $R_1$ is a radical selected from the group consisting of monocyclic carbocyclic radicals and alkenyl radicals of from 1 to 3 carbon atoms, $R_2$ is a radical selected from the group consisting of alkyl radicals and alkenyl radicals of from 1 to 3 carbon atoms and $R_3$ is a radical selected from the group consisting of hydrogen and alkyl radicals of from 1 to 4 carbon atoms.

According to the invention we provide a process for the manufacture of the said new pyrimidine derivatives which comprises condensation of a malondiamide derivative of the formula

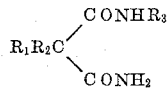

wherein $R_1$, $R_2$ and $R_3$ have the meaning set forth above, with formamide.

The said condensation may be brought about conveniently by heating the reactants together.

In experimental animals the said new pyrimidine derivatives show such anti-convulsant properties as to render them of potential value in the control of epilepsy. The said anti-convulsant properties are superior to those shown by the corresponding barbituric acid from which the new pyrimidine derivatives are, or may be regarded as being, derived.

The invention is illustrated but not limited by the following examples in which the parts are by weight.

Example 1

50 parts of α,α-phenylethylmalondiamide and 150 parts of formamide are boiled together under reflux for two hours. The mixture is then cooled to 0° C. and filtered. The solid residue is washed with 50 parts of ethanol and then crystallized from 660 parts of an 80% ethanol water mixture. There is obtained 5-phenyl-5-ethylhexahydropyrimidine-4,6-dione, M. P. 281–282° C.

Example 2

16 parts of α,α-phenylmethylmalondiamide (M. P. 150–151° C.) and 55 parts of formamide are boiled together under reflux during 90 minutes. The mixture is then cooled and is filtered. The solid residue is crystallized from 80% aqueous ethyl alcohol and there is obtained 5-phenyl-5-methylhexahydropyrimidine-4,6-dione, M. P. 295–6° C.

There have also been obtained by processes similar to that of the above example, save that there is used in place of the 16 parts of α-phenyl-α-methylmalondiamide a corresponding quantity of the appropriately substituted malondiamide, 5-phenyl-5-n-propylhexahydropyrimidine-4,6-dione, M. P. 308–9° C., 5-phenyl-5-isopropylhexahydropyrimidine-4,6-dione, M. P. 303° C., 5-phenyl-5-allylhexahydropyrimidine-4,6-dione, M. P. 295–6° C., and 5-cyclohexyl-5-n-propylhexahydropyrimidine-4,6-dione, M. P. 320° C.

The appropriately substituted malondiamides used in making the compounds mentioned above may be obtained from the correspondingly substituted malonic esters by hydrolysis with aqueous alcoholic sodium hydroxide to give the corresponding malonic acids which are converted by means of phosphorus pentachloride to the malonyl chlorides and these are finally reacted with aqueous ammonia. There were thus obtained, for example, α-phenyl-n-propylmalondiamide, M. P. 173° C., α,α-phenylisopropylmalondiamide, M. P. 222° C., α,α-phenylallylmalondiamide, M. P. 107°–110° C., and α,α-cyclohexyl-n-propylmalondiamide, M. P. 240–241° C.

Example 3

17 parts of α,α-phenylethyl-N-ethylmalondiamide and 120 parts of formamide are boiled together under reflux for 90 minutes. The mixture is then cooled, water is added and the mixture is then filtered. The residue is crystallized from water and 5-phenyl-1,5-diethylhexahydropyrimidine-4,6-dione is obtained, M. P. 135–136° C.

By the process of the above example, using in place of the α,α-phenylethyl-N-ethylmalondiamide, other appropriately substituted N-alkylmalondiamides, there have been obtained: 5-phenyl-1,5-dimethylhexahydropyrimidine-4,6-dione, M. P. 174° C., 5-phenyl-5-methyl-1-n-propylhexahydropyrimidine-4,6-dione, M. P. 150–151° C., 5-phenyl-5-ethyl-1-methylhexahydropyrimidine-4,6-dione, M. P. 185–186° C., 5-phenyl-5-ethyl-1-n-propylhexahydropyrimidine-4,6-dione, M. P. 124–125° C. and 5-phenyl-5-n-propyl-1-methylhexahydropyrimidine-4,6-dione, M. P. 166–167° C.

The α,α-phenylalkyl-N-alkylmalondiamides used in the process of the above examples may be obtained from the appropriately $a,a$-disubstituted ethylcyanacetates by action firstly of aqueous alcoholic amines to give the $a,a$-phenylalkyl-N-alkylcyanoacetamides which are then converted to the diamides by means of cold concentrated sulphuric acid. There are thus obtained $a,a$-phenylmethyl - N - methylmalondiamide, M. P. 153° C., $a,a$-phenylmethyl - N - n - propylmalondiamide, M. P. 81° C., $a,a$-phenylethyl-N-methylmalondiamide, M. P. 144–145° C., $a,a$-phenylethyl-N-ethylmalondiamide, M. P. 126–127° C., $a,a$-phenylethyl-N-n-propylmalondiamide, M. P. 106–107° C., and $a,a$-phenyl-n-propyl-N-methylmalondiamide, M. P. 114–166° C.

*Example 4*

1 part of $a,a$-diallylmalondiamide is boiled under reflux for one hour with 4 parts of formamide. The mixture is then cooled and filtered. The solid residue is crystallized from aqueous ethanol and 5,5-diallylhexahydropyrimidine-4,6-dione is obtained, of M. P. 314–5° C.

We claim:

1. Process for the manufacture of new pyrimidine derivatives of the general formula

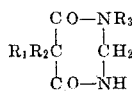

wherein $R_1$ is a radical selected from the group consisting of monocyclic carbocyclic radicals of six carbon atoms and alkenyl radicals of from 1 to 3 carbon atoms, $R_2$ is a radical selected from the group consisting of alkyl radicals and alkenyl radicals of from 1 to 3 carbon atoms and $R_3$ is a radical selected from the group consisting of hydrogen and alkyl radicals of from 1 to 4 carbon atoms, which comprises condensation of a malondiamide derivative of the formula

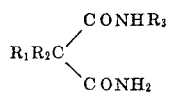

wherein $R_1$, $R_2$ and $R_3$ have the meaning set forth above with formamide.

2. Process for the manufacture of 5-phenyl-5-ethylhexahydropyrimidine-4,6-dione which comprises condensation of $a,a$-phenylethylmalondiamide with formamide.

WILLIAM ROBERT BOON.
HERBERT CLARE CARRINGTON.
CHARLES HENRY VASEY.

No references cited.